June 21, 1966 C. K. LEEPER 3,256,819
GAS GENERATOR

Filed April 2, 1964 2 Sheets-Sheet 1

INVENTOR

CHARLES K. LEEPER

BY Laurence R. Hepter

ATTORNEY

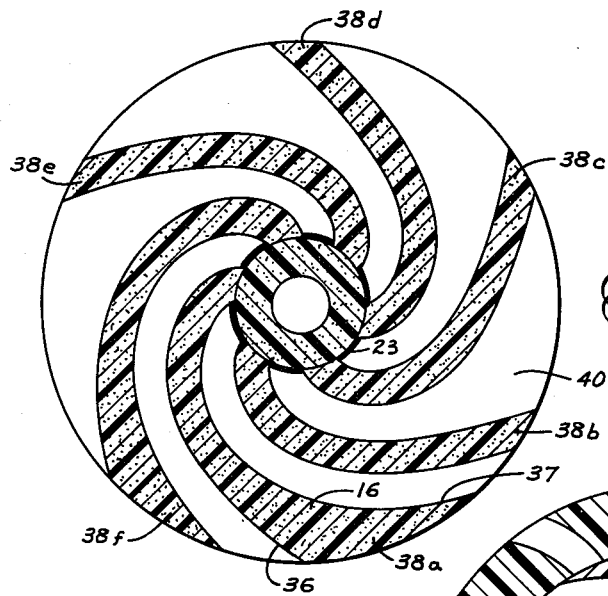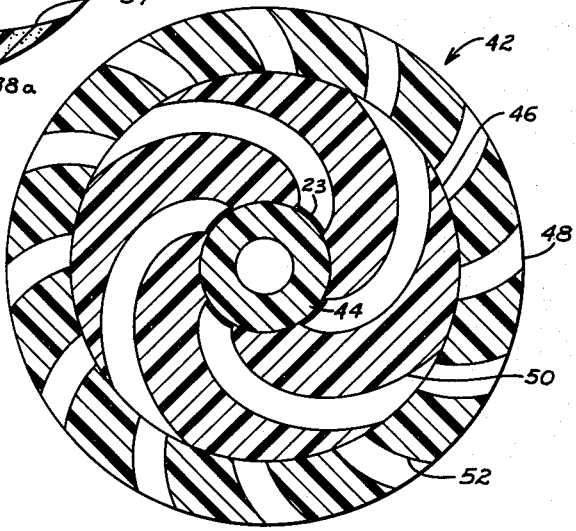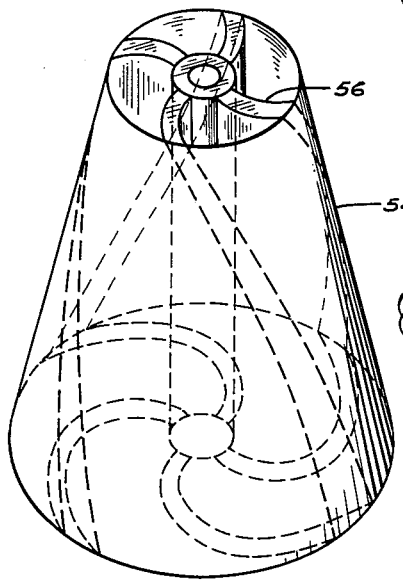

United States Patent Office 3,256,819
Patented June 21, 1966

3,256,819
GAS GENERATOR
Charles K. Leeper, Orangevale, Calif., assignor to Atlantic Research Corporation, Fairfax County, Va., a corporation of Virginia
Filed Apr. 2, 1964, Ser. No. 356,980
19 Claims. (Cl. 102—98)

This invention relates to solid propellants and, more particularly, to an improved solid propellant grain design.

Solid rocket propellants are well established; however, current grain designs have many limitations and disadvantages thus reducing the use of solid propellants to a limited number of applications. For example, one of the requirements for efficient rocket performance is the need to maximize the loading density of the rocket, i.e., reduce the void percentage. While solid end-burning grains provide high loading density, they are noted for a relatively low rate of propellant gas generation, gas generation being proportional to the product of the propellant burning rate and the burning surface area.

To increase the rate of gas generation propellants having a perforated grain design or a multiple cylindrical grain design have been used since they provide the desired burning surface area. However, in addition to reducing considerably the loading density, such propellant grain structures generally result in structurally-weakened grains requiring the use of propellant material having high strength characteristics and also often requiring external supporting means.

Another disadvantage of some perforated grains, such as the star or cruciform grains, is their characteristic incomplete propellant utilization. It is well known that these types of grains do not burn all of the propellant but instead leave slivers of propellant unburned, these slivers amounting to between three and five percent of the total propellant load. In addition to monetary considerations, which is secondary, this condition is extremely undesirable due to the increased propellant weight required per unit of thrust. Furthermore, the remaining slivers tend to increase the tail-off thrust, an undesirable result.

Another problem with prior designs arises from the desirability of utilizing the maximum available space within the rocket propellant chamber. To achieve this goal the propellant usually is in contact with the casing and often is bonded to the casing for structural reasons. The casing, however, undergoes considerable variation in size due to thermal and pressurization changes. Because of the bonding of the propellant to the casing the propellant grains are also required to undergo similar dimensional changes resulting in weakened grain structures.

It is usually desirable to provide a propellant grain structure capable of neutral burning, that is, having a constant burning surface area. This has been achieved in the past by providing a plurality of closely arranged internal-external burning cylindrical grains. It has been found, however, that such an arrangement results in a pressure differential across the cylindrical grain walls often causing failure of the grain structure. To avoid such failure, propellants having sufficient inherent mechanical rigidity are required or, alternatively, grain reinforcing members must be used. This restricts the use of such grain designs to certain propellants.

In some instances it is desirable to provide a solid propellant with a built-in variable burning rate. An example of such a case would be where it is desirable to have increased thrust during take-off and a reduced constant thrust subsequent to take-off. It is extremely difficult to provide such a variable burning rate with current grain designs.

The above represents just a few of the problem areas which have been encountered in the use of solid propellants in rockets. The present invention provides a propellant grain design which not only obviates all of the above described problems but also provides a grain structure which has many additional advantages which, heretofore, have been unattainable by any other known grain design.

Accordingly, it is one object of the present invention to provide an improved solid propellant grain which permits a high loading density coupled with a large burning surface area.

Another object of the present invention is to provide an improved solid propellant grain which permits expansion and contraction of the vehicle casing without detrimental effects on the propellant grain.

A further object of the present invention is to provide an improved solid propellant grain capable of providing either a constant or a variable burning surface area and mass burning rate.

A still further object is to provide an improved solid propellant grain capable of complete consumption during burning.

Further objects and attendant advantages of the present invention will become better understood from the following description.

Briefly stated, this invention in one form provides a unique grain design for a solid propellant structure. The propellant structure comprises a cylindrical core and a cylindrical shell or casing surrounding and spaced from the core. Extending from the core to the shell and attached to both are a plurality of involute-shaped webs formed of a solid propellant, each web being an individual propellant grain. The number of webs and the thickness of each web are controlled by the desired mass burning rate and the particular propellant employed. To utilize more efficiently the available volume within the vehicle casing the core can also be formed of a propellant. A single grain propellant structure can be achieved by integrally forming the plurality of webs and the core.

While the specification concludes with claims particularly pointing out and distinctly claiming the subject matter which is regarded as the invention, it is believed that the invention will become better understood from the following description taken in combination with the accompanying drawings in which the numeral reference system for given elements is consistent throughout the several figures.

FIGURE 4 is a cross-sectional view of a solid propellant structure illustrating several web modifications of the grain design illustrated in FIGURE 1.

FIGURE 5 is a cross-sectional view of a solid propellant structure formed in accordance with a second embodiment of this invention.

FIGURE 6 is a perspective view of a solid propellant structure formed in accordance with a third embodiment of this invention.

Figure 1:
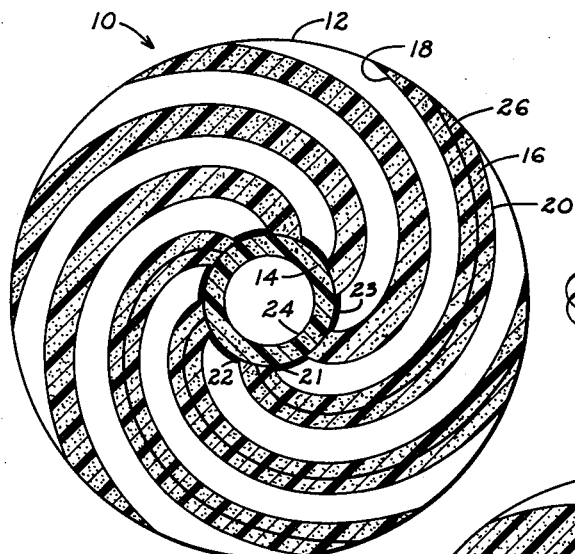
FIGURE 1 is a cross-sectional view of a solid propellant structure formed in accordance with a first embodiment of this invention.

With reference to the drawings, and in particular FIGURE 1, there is shown a composite solid propellant structure 10 which includes a cylindrical outer shell 12, a cylindrical core 14 mounted concentrically within the shell 12 and a plurality of propellant grains or webs 16 extending outwardly from the core 14 to the shell 12.

The shell 12 represents the outer extremity of the propellant structure and may be the wall of any propellant-containing chamber such as a rocket casing. The cross-section of the propellant grains 16 is arcuate or, more specifically, of the generally spiral shape. The term spiral, as used herein, is intended to be used in its broadest definition, that is, referring to a curve which rotates continuously about a fixed center point while constantly receding from that point. A spiral has no fixed length and the term, as used in this specification, is intended to refer to any arcuate length of a spiral curve. The preferred spiral cross section to be used in the construction of the subject propellant grains is an involute of a circle, an involute being defined as the curve traced by the end of a taut string which is unwound from the circumference of a fixed generating circle. The equations of the curve in parametric form are:

$$x = c(\cos u + \text{rad } u \sin u), \quad y = c(\sin u - \text{rad } u \cos u)$$

where $c$ is the radius of the generating circle and rad $u$ is the radian measure of the angle $u$ which a line drawn from the center of the generating circle to a point on the involute makes with the $x$ axis. The involute can be completely described by a single dimension, namely, the diameter or radius of the generating circle.

As may be seen in FIGURE 1, each curvilinear surface 18, 20 of each propellant grain 16 describes an involute of the core 14, the initiating points 21, 22 of the involutes 18, 20, respectively, being displaced from one another along the circumference of the core 14. Such a structure forms a grain having the desirable property of uniform thickness at all points along the arcuate length of the grain with the exception of the relatively small area near the casing 12 where the grain thickness varies from zero to full thickness in a reasonably short arcuate length. Furthermore, the arcuate length of both surfaces 18, 20, and of each element between these two surfaces is exactly the same. It is this property that gives a propellant grain having a pure involute cross-section a precisely constant burning area. The burning area remains constant whether either surface 18 or 20 is burned individually or whether both surfaces 18, 20 are burned concurrently. This may be seen by realizing that the surface resulting from the burning of a differential thickness of propellant is also an involute having the same characteristic dimension, i.e., the diameter of the generating circle, that the original burning surface had.

The loading density can be increased by either increasing the thickness of the individual propellant grains or by increasing the number of individual propellant grains. By either of these methods the loading density can be varied from slightly less than 100% down to any value desired, the only voids being the spacing between adjacent grains and the space within the core. Of course, increasing the thickness of the grains also increases the overall burning time of the propellant. To help increase the propellant loading density the core 14 may also be fabricated from a propellant composition.

If desired, the propellant structure illustrated in FIGURE 1 can be constructed as a single grain (not shown) by integrally forming the individual propellant webs 16 with the core 14. To maintain structural integrity of the core during burning and to provide a constant mass burning rate an inhibitor 23 is bonded to the outer surface of the core between adjacent webs 16. Furthermore, the thickness of the core 14 must be at least one half the thickness of the webs 16 to ensure that the core does not burn out before the webs. It should be noted that if the core is formed of a propellant, the resultant propellant structure will be slightly progressive, i.e., the burning surface area will increase with burning time, since the burning will take place along the internal burning surface 24 of the core 14.

Strengthening of the individual propellant webs 16 may be accomplished by providing a planar reinforcing member 26 centrally within each web 16, the reinforcing member 26 having the same involute shape as the web 16. The primary advantage of using such a reinforcing member 26 is the support the member provides as the grain nears burn-out. FIGURE 1 illustrates six involute-shaped grains, only three of which contain the reinforcing member 26.

Any solid propellant composition which is moldable, castable or extrudable can be used, such as double-base, e.g., nitrocellulose plasticized with nitroglycerine or other nitrated liquid plasticizer; composite propellants comprising an organic binder, e.g., polyvinyl chloride, polyurethane, polyether polysulfide (Thiokol), polybutadiene acrylic acid, etc., and an oxidizer, e.g., ammonium and alkali metal nitrates and perchlorate, metal peroxides, etc.

Figure 2:
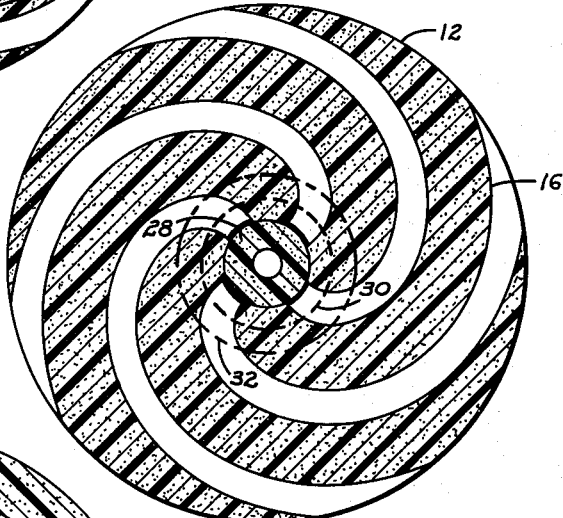
FIGURE 2 is a cross-sectional view of the solid propellant structures illustrating two core modifications of the propellant of FIGURE 1.

Various properties of the propellant structure and the mass burning rate can be obtained by varying the diameter of the core 14 relative to the shell 12. As can be seen in FIGURE 2, variation in the ratio of core diameter to shell diameter affects the angle at which the grain web 16 meets the core resulting in a variation in stress concentrations at these juncture points. FIGURE 2 illustrates a core 28 having a smaller diameter than the generating circle 30 and a core 32 having a larger diameter than the generating circle. Variation in core diameter also affects the mass burning rate since the burning surface area will vary and the degree of progressivity caused by the internal burning of the core will vary depending upon the burning surface area of the core, the surface area being directly proportional to the core diameter.

Figure 3:
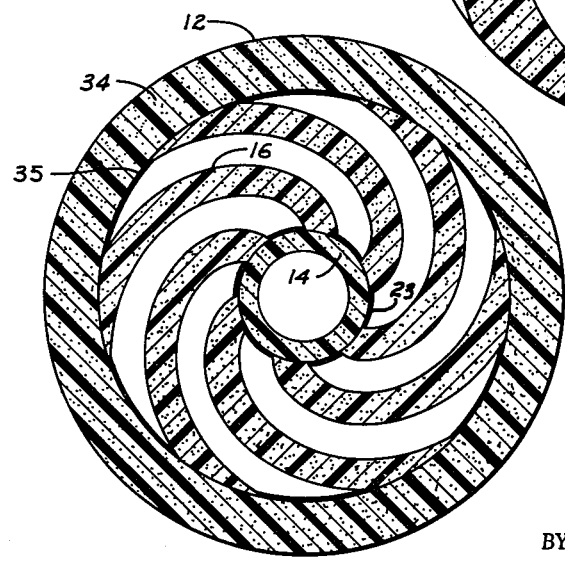
FIGURE 3 is a cross-sectional view of a solid propellant structure illustrating a shell modification of the propellant of FIGURE 1.

FIGURE 3 illustrates a modification of the embodiment illustrated in FIGURE 1, wherein the shell 12 is formed from a propellant composition, as shown at 34. A single propellant grain (not shown) can be formed as such a structure by integrally forming the webs 16, the core 14 and the shell 34. This single grain structure has the advantages of homogeneity throughout, even across the boundary lines between the web and the core and the web and the shell. However, complex manufacturing procedures are required to form a single grain propellant in this shape. A composite structure of a plurality of grains can be formed more easily by fabricating the core 14, the web 16, and the shell 34 independently and bonding them together. Since the shell 34 is burned on its outer surface and an inhibitor 35 is bonded to the inner surface between adjacent webs 16, the burning surface area is continually reduced resulting in a regressive burning characteristic. The thickness of the shell 34 must be at least one half that of the webs 16 to prevent burning out of the shell 34 before the webs. By proper dimensional choice of the core 14 and the shell 34 the propellant structure can be formed to be either progressive, regressive, or neutral. This is achieved by proper balance between the progressivity of the core 14 and the regressivity of the shell 34.

Because the mass burning is dependent upon the burning surface area, the mass rate of gas generation can be varied by forming the grain web 16 in a general spiral shape but providing slightly different curvatures for one of the burning surfaces 36 as compared with the other burning surface 37 of the web 16, as may be seen in the composite FIGURE 4 which illustrates various shaped grains 38a, 38b, 38c, 38d, 38e, 38f. By proper design of the grain 38a in this manner, increased thrust can be attained during start-up by providing the largest burning surface area during the initial burning. As the burning continues the available burning surface area is reduced resulting in a decrease in available thrust. Furthermore, by such a variation in web thickness and/or curvature the flow area 40 for the combustion products can also be varied as required for particular applications.

A second embodiment of the present invention, which is illustrated in FIGURE 5, may be described as a propellant structure 42 having a plurality of concentric series of webs. The structure 42 includes a central core 44, an intermediary shell 46, and an outer shell 48 surrounding and concentric with the intermediary shell 46 and the central core 44. A first series of propellant webs 50 extends from the central core 44 to the intermediary shell 46 which serves as a support shell for the webs 50. The intermediary shell 46 is also the generating cylinder for a second series of propellant webs 52 which project from the intermediary shell 46 to the outer shell 48. The use of such a structure permits the choice of angle at which the propellant web meets the outer shell. This angle varies as the distance from the core to the outer shell varies and, if a single web series structure is used, the particular dimensions of the core and the shell will determine the angle at which the web meets the shell. However, if a multi-web series structure is used the desired angle of incidence can be attained by proper choice of the diameter of the intermediary shell or shells.

The design of a propellant grain formed in accordance with this invention permits maximum utilization of the volume available in any reasonable cavity of revolution to produce constant burning area for gas generation. For example, FIGURE 6 illustrates a truncated conical propellant chamber 54 including propellant grains 56 having an involute cross-section mounted therein. The various modifications of the cylindrical propellant chamber discussed in connection with FIGURES 1 through 5 may be employed in non-cylindrical chambers as illustrated in FIGURE 6. Various other non-cylindrical shapes suggest themselves for proper application of this principle. For example, concentric cones having identical or different vertex angles and vertex locations may be used. This illustrates the flexibility of design that can be achieved with propellant grains formed in accordance with this invention.

Solid propellant structures formed in accordance with this invention have many advantages over prior art propellant structures. It can be seen that the loading density can be varied either by varying the number of propellant webs employed or by varying the width of each web. Because of the ability to vary the loading density so widely, the linear burning rate of the particular propellant used is relatively unimportant. Thus, many propellants which were previously restricted to very limited circumstances, can be used more widely. Another advantage of the subject design is the increased strength of the propellant webs as compared with the perforated grains using star or cruciform configurations. This is because the webs are supported at both radial ends as compared with the perforated grains which, in effect, have a cantilever construction near their center. Furthemore, it is well known that such perforated grains are inefficient with respect to complete burning of the propellant, that is, slivers of propellant remain unburned. The percentage of slivers remaining has been estimated to be generally approximately 3 to 5% of the total propellant. In view of the desirability of reducing rocket dead weight and tail-off thrust, it is extremely advantageous to utilize a propellant design which is sliverless. The present invention provides such a design.

Another major advantage of the present invention is the structural flexibility inherent in the curvature of the webs. This flexibillty permits expansion and contraction of the casing, which occurs from various thermal and pressure conditions, without affecting the structural integrity of the propellant structure. As may be seen from the above-discussed figures, a high degree of uniformity of distribution of propellant and flow area or port area is produced by the subject structure. The pressure uniformity produced by this design eliminates the structural problems caused by designs producing a pressure gradient across the grain. Additionally, this invention permits economical use of the vehicle casing volume whether the casing is of the conventional cylindrical shape or any other reasonable volume of revolution. A still further advantage over prior art propellant structure is the ability to vary the gas generation curve or, in other words, the mass burning rate. This can be achieved by varying the curvature of the web as it extends outwardly from the core.

While various specific embodiments have been shown and described above, it will be obvious to those skilled in the art that various changes and modifications may be made without departing from the invention in its broader aspects. Therefore, it is intended in the appended claims to cover all such changes and modifications that may fall within the true spirit and scope of this invention.

What is claimed as new and desired to be secured by Letters Patent of the United States is:

1. A gas generator comprising a casing and a solid grain of combustible material mounted therein, said grain comprising a plurality of spaced-apart webs projecting generally radially inwardly from said casing toward the axis of said casing, each of said webs having an arcuate cross section in the plane normal to said axis and a pair of spaced-apart curvilinear surfaces extending generally parallel to said axis and generally radially inwardly from said casing, combustion of said grain taking place on at least one of said surfaces of each of said webs.

2. A gas generator as defined in claim 1 including a curvilinear reinforcing member embedded within each of said webs, said reinforcing member being substantially parallel to said surfaces of its respective web.

3. A gas generator as defined in claim 1 wherein said cross section is an involute.

4. A gas generator comprising a casing and a solid grain of combustible material mounted therein, said grain comprising a core located coaxially within said casing and a plurality of spaced-apart webs projecting generally radially inwardly from said casing to said core and being joined to said core, each of said webs having an arcuate cross section in the plane normal to the axis of said casing and a pair of spaced-apart curvilinear surfaces extending generally parallel to said axis and generally radially inwardly from said casing, combustion of said grain taking place on at least one of said surfaces of each of said webs.

5. A gas generator as defined in claim 4 including an arcuate reinforcing member embedded within each of said webs, said reinforcing member being substantially parallel to said surfaces of its respective web.

6. A gas generator as defined in claim 4 wherein said cross section is an involute.

7. A gas generator as defined in claim 4 wherein the thickness of each of said webs is essentially constant along the arcuate length thereof, said thickness being measured in said plane in a direction normal to the arcuate length of said webs.

8. A gas generator as defined in claim 4 wherein the thickness of each of said webs varies along the arcuate length thereof, said thickness being measured in said plane in a direction normal to the arcuate length of said webs.

9. A gas generator as defined in claim 4 wherein said casing and said core are substantially cylindrical and each of said webs is joined to said core along the entire length thereof and wherein said core has a bore extending axially therethrough.

10. A gas generator as defined in claim 4 including a shell of combustible material mounted between said casing and said webs coaxial with and spaced from said core, each of said webs being joined at one radial end thereof to said shell and at the other radial end thereof to said core.

11. A gas generator as defined in claim 10 including an arcuate reinforcing member embedded within each of said webs, said reinforcing member being substantially parallel to said surfaces of its respective web.

12. A gas generator as defined in claim 10 wherein said cross section of each of said webs is an involute.

13. A gas generator comprising a casing and a solid grain mounted therein, said grain comprising a core located coaxially within said casing, a shell coaxial with and spaced from said core and said casing, a first series of spaced-apart webs joined to and projecting generally radially outwardly from said core to said shell and a second series of spaced-apart webs joined to and projecting radially outwardly from said shell toward said casing, each of said webs being of combustible material having an arcuate cross section in the plane normal to the axis of said casing and a pair of spaced-apart curvilinear surfaces extending generally parallel to said axis and generally radially, combustion of said grain taking place on at least one of said surfaces of each of said webs.

14. A gas generator as defined in claim 13 wherein the cross section of each of said webs is an involute.

15. A gas generator as defined in claim 13 wherein said core is cylindrical and is formed of a combustible material.

16. A gas generator as defined in claim 13 wherein said core and said shell are formed of a combustible material.

17. A gas generator as defined in claim 13 including an arcuate reinforcing member embedded within each of said webs, said reinforcing member being substantially parallel to said surfaces of its respective web.

18. A gas generator comprising a casing and a solid grain of combustible material mounted therein, said grain comprising a core located coaxially within said casing, a shell coaxial with and spaced from said core and having a shape of a noncylindrical surface of revolution, and a plurality of spaced-apart webs joined to and projecting generally radially outwardly from said core to said shell, each of said webs having an arcuate cross section in a plane normal to the axis of said casing and a pair of spaced-apart curvilinear surfaces extending generally parallel to said axis and generally radially inwardly from said casing, combustion of said grain taking place on at least one of said surfaces of each of said webs.

19. A gas generator as defined in claim 18 wherein said cross section is an involute.

References Cited by the Examiner

UNITED STATES PATENTS

| | | | |
|---|---|---|---|
| 660,568 | 10/1900 | Gathmann | 102—98 |
| 683,106 | 9/1901 | Du Buit | 102—98 |
| 694,295 | 2/1902 | Maxim | 102—98 |
| 2,661,692 | 12/1953 | Vegren | 102—98 X |
| 2,933,041 | 4/1960 | Ambrose | 60—35.6 |
| 3,140,663 | 7/1964 | Rumbel et al. | 102—98 |
| 3,164,093 | 1/1965 | Holzman et al. | 102—98 |
| 3,201,936 | 8/1965 | Bacelin | 60—35.6 |

OTHER REFERENCES

"Recent Advances in Solid Propellant Grains,": ARS Journal, vol. 29, No. 7, July 1959, pp. 483–491 (p. 484 required).

"Aquasi-Morphological Approach to the Geometry of Charges for Solid Propellant Rockets," by J. M. Vogel: Jet Propulsion Magazine, vol. 26, No. 2, February 1956, pp. 102–105.

BENJAMIN A. BORCHELT, *Primary Examiner.*

R. F. STAHL, *Assistant Examiner.*